UNITED STATES PATENT OFFICE.

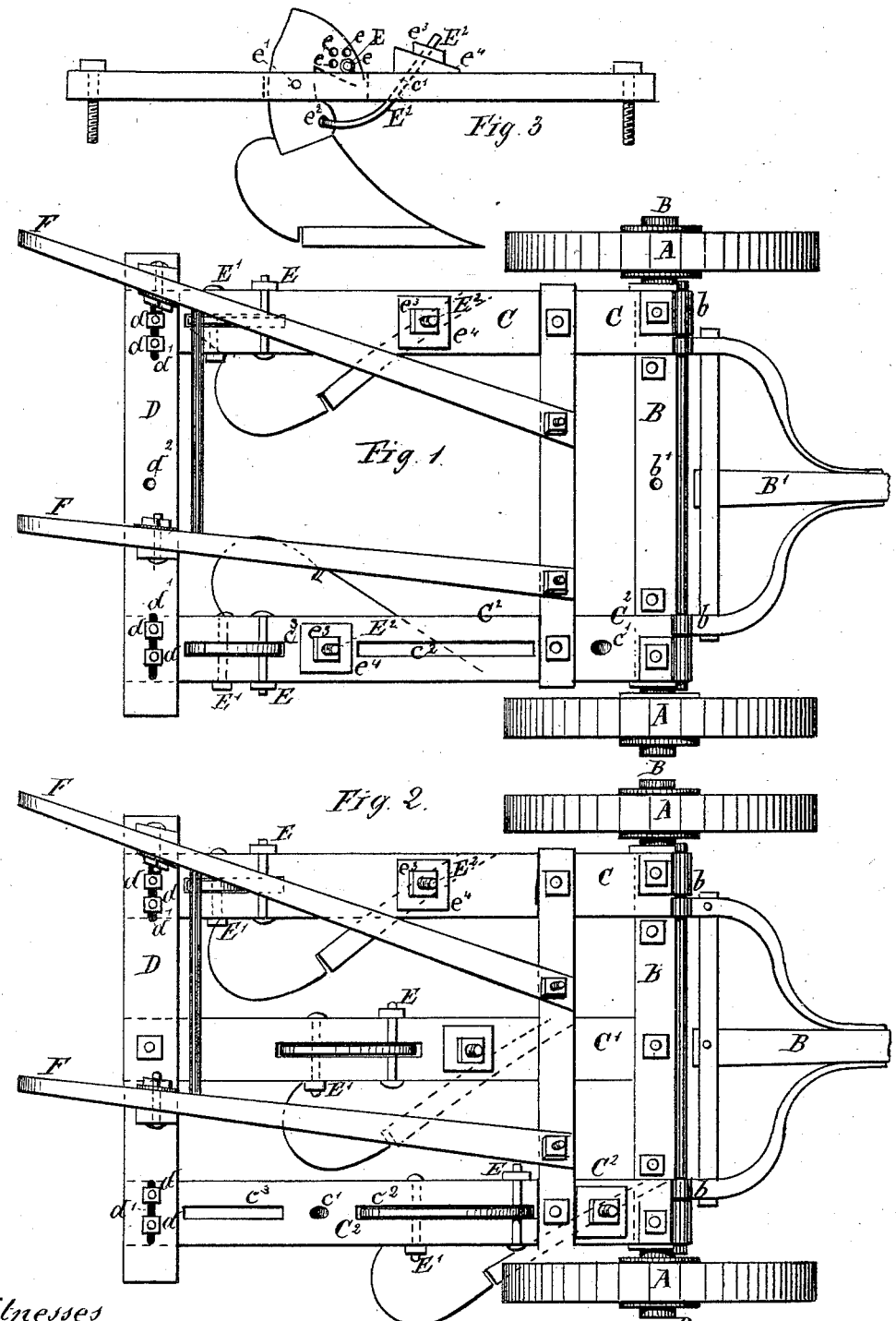

RALPH D. RUSH AND EPHRAIM W. RUSH, OF WASHINGTON, NEW JERSEY.

IMPROVEMENT IN GANG-PLOWS.

Specification forming part of Letters Patent No. 175,879, dated April 11, 1876; application filed January 24, 1876.

*To all whom it may concern:*

Be it known that we, RALPH D. RUSH and EPHRAIM W. RUSH, both of Washington, in the county of Warren and State of New Jersey, have invented certain new and useful Improvements in Combined Corn and Gang Plows; and we do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1 is a top or plan of our invention, as arranged for plowing corn. Fig. 2 is a like view of same, as a gang-plow; and Fig. 3 is a side view of one of the plows and its beam.

Similar letters of reference indicate corresponding parts in all the figures.

A A are the wheels and B the axle, to which the front ends of the plow-beams are attached. B' is the pole, to which the horses are attached, the pole being hinged to the axle or to the plow-beams C C$^2$, as indicated at $b\ b$. Each of the beams C C$^1$ C$^2$ carries one plow, of which there are four, three of them having their shares and mold-boards arranged to turn a furrow toward the right hand, the other one turning its furrow toward the left hand, for a purpose which will soon be explained.

The standard of each plow is expanded at the upper end into a sort of head, the upper front side of which is circular in form, and provided with a series of holes, $e\ e$, to receive an adjusting pin or bolt, E, and with a hole, $e^1$, to receive a pivot, E$^1$, and with another hole, $e^2$, through the lower part of the standard, to which a draft-link, E$^2$, is connected. This standard passes through a vertical slot, $c$ or $c^2$, in the beam, the draft-link E$^2$ passing an inclined hole, $c^1$, in the beam, as indicated by dotted lines in Fig. 3. $e^3$ is a screw-nut on the upper end of draft-link E$^2$. $e^4$ is a wedge-shaped washer under the nut $e^3$.

By means of this construction and arrangement of devices, in combination with the wheels A A and axle B, (which support the front end of each beam at a uniform height from the ground,) the plows may be set to run at any required depth, it being apparent that if pin or bolt E be moved into one of the upper holes, and a corresponding adjustment be made in the draft-link by means of nut $e^3$, (See Fig. 3,) the plow will run deeper than it will when the parts are in the position shown in the drawing.

An advantage growing out of this construction of devices for effecting the desired adjustment is this: the strain is divided between three points, both in the standard and in the beam; hence, greater strength and durability is secured with the same weight of metal and size of beam.

Beams C C$^2$ are pivoted to the axle B, and are adjustably secured to girt D by means of bolts $d$, which are arranged in slots $d^1$ in said girt. F are the handles placed diagonally to the beams, in order that the operator may walk between the rows when the invention is used for plowing corn, under the arrangement shown in Fig. 1, where, it will be observed, two plows are placed opposite to each other, and with their mold-boards turned toward each other.

It will be seen that the beams C C$^2$ may be adjusted laterally, as it may be found advisable to throw the furrow closer to or further from the corn.

In order to convert the corn-plow into a gang-plow we place the beam C$^1$ between the other two beams, and bolt it securely to the axle and girt D through holes $b'$ and $d^2$. (See Fig. 1.) Beam C$^1$ has the plow attached a little to the rear of its center. (See Figs. 2 and 3.) We then remove from beam C$^2$ the plow shown in Fig. 1, and substitute therefor the fourth plow above mentioned, which turns its furrow to the right, placing this last-mentioned plow in the slot near the front end of the beam, marked $c^2$ in Fig. 1, thus leaving the slot in the rear end of this beam (marked $c^3$, Fig. 2) vacant. We have now all three plows arranged to turn their furrows to the right, and all in the proper order or sequence for working in a gang.

What we claim is—

1. The combination, with a slotted plow-beam, of plow, having a standard provided with holes $e\ e^1\ e^2$, the pin E, pivot E$^1$, and adjustable link E$^2$, substantially as set forth.

2. The combination of the wheels A A, the axle B, the plow-beam C, the removable beam C¹, and the beam C², provided with two slots, $c^2\ c^3$, whereby the plows may be arranged for plowing corn, or as a gang-plow, at the option of operator, substantially as set forth.

In testimony that we claim the foregoing as our own we affix our signatures in presence of two witnesses.

RALPH D. RUSH.
EPHRAIM W. RUSH.

Witnesses:
  JOHN H. DEREMER.
  HAMILTON HEIMERMAN.